UNITED STATES PATENT OFFICE 2,434,039

MANUFACTURE OF NEW PYRROLE COLOURING MATTERS

Eric Paul Goodings and Maurice Arthur Thorold Rogers, Blackley, Manchester, England, assignors to Imperial Chemical Industries Limited, a corporation of Great Britain No Drawing. Application July 9, 1943, Serial No. 494,126. In Great Britain July 13, 1942

5 Claims. (Cl. 260—240)

The present invention relates to the manufacture of new compounds.

In our copending application Serial No. 494,119 filed July 9, 1943, it is proposed to make tetraaryldipyrromonomethines by reacting together a 2:4-diarylpyrrole of the formula

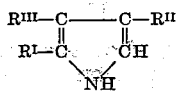

with an aldehyde of the formula

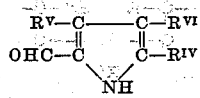

where $R^I$, $R^{II}$, $R^{IV}$ and $R^V$ stand for aryl radicals, for example of the benzene or naphthalene series, substituted or not, the same or different, and where $R^{III}$ and $R^{VI}$ each stand for hydrogen or for a non-reactive substituent, the same or different, for example an aryl-, alkyl-, alkylamino-, benzylideneamino- or acylamino- radical; and in our copending application Serial No. 494,124 filed July 9, 1943, it has been proposed to make monomethines of the formula

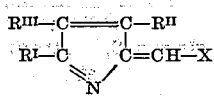

where $R^I$, $R^{II}$ and $R^{III}$ have the significance given above, by reacting 2:4-diarylpyrroles of the same general formula given above with an aldehyde of the formula XCHO, other than a 5-formyl-2:4-diarylpyrrole. In obtaining the new compounds in accordance with these copending applications equimolecular proportions of the aldehydes and the pyrroles are required. The present invention is directed to the production of new compounds by the interaction of two molecular proportions of the 2:4-diarylpyrroles with a single molecular proportion of an aldehyde.

According to the present invention we provide a process for the manufacture of new compounds which comprises causing to interact two molecular proportions of one or more 2:4-diarylpyrroles of the formula given above, and one molecular proportion of an aldehyde of the formula XCHO, where X is an organic radical.

Suitable 2:4-diarylpyrroles include 2:4-diphenylpyrrole, 2-phenyl-4-(p-methoxyphenyl)-pyrrole, 2-(p-methoxyphenyl)-4-phenylpyrrole, 2-(m-hydroxyphenyl)-4-phenylpyrrole, 2-(o-chlorophenyl)-4-phenylpyrrole, 2-(p-acetylaminophenyl)-4-phenylpyrrole, 2-α-naphthyl-4-phenylpyrrole, 2-phenyl-4-β-naphthylpyrrole, 2:3:4-triphenylpyrrole, 3-benzoylamino-2:4-diphenylpyrrole, 3-acetylamino-2:4-diphenylpyrrole, 3-benzoylamino-2:4-di-p-tolylpyrrole and 3-acetoacetylamino-2:4-diphenylpyrrole. The preparation of certain of said 2:4-diphenylpyrroles is described in copending application Serial No. 457,229 filed September 3, 1942, now Patent No. 2,382,915 issued August 14, 1945, in Serial No. 475,434 filed February 10, 1943, now abandoned, and in corresponding British Patent No. 556,156. Also included are the sulphonic acids of the 2:4-diarylpyrroles, which may be made, for example, by sulphonating the above compounds. The preparation of such sulfonic acids is described in our copending application Serial No. 482,479 filed April 9, 1943, now Patent No. 2,382,917 issued August 14, 1945.

Suitable aldehydes include 5-formyl-2:4-diphenylpyrrole, benzaldehyde, 4-dimethylaminobenzaldehyde, 4-(ethyl-β-chloroethylamino)-benzaldehyde, 5-formyl-cresotinic acid, 2-chlorobenzaldehyde, 4-chlorobenzaldehyde, benzaldehyde-4-sulphonic acid, 4-formyl-diphenylamine, 4-methoxybenzaldehyde and salicylaldehyde. The aldehydes may be used in the form of their simple functional derivatives, for example in the form of an oxime or an anil.

The formation of the new compounds is represented, in equation form, as follows:

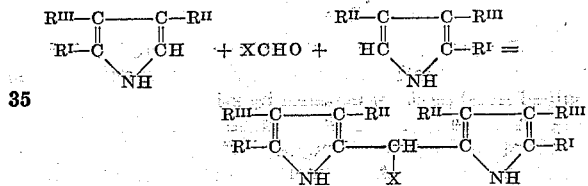

where $R^I$, $R^{II}$, $R^{III}$ and XCHO have the significance given above. They are called tetraaryldipyrromonomethanes or, more exactly, meso-substituted tetraaryldipyrromonomethanes.

It will be understood that the new compounds obtained as set forth above may be symmetrical or unsymmetrical. For instance, if a single 2:4-diarylpyrrole is used a symmetrical tetraaryldipyrromonomethane is obtained; if two different 2:4-diarylpyrroles are used, then unsymmetrical tetraaryldipyrromonomethanes are obtained.

In carrying the process of the invention into effect, the ingredients may conveniently be brought into reaction by heating in a mutual solvent, advantageously in the presence of an acidic condensing agent, for example hydrochloric acid, potassium hydrogen sulphate, sulphuric acid or perchloric acid. The products, which are themselves colourless leuco compounds, are easily oxidised, even by contact with air, into the corresponding methines.

It is a further feature of the invention to obtain meso-substituted tetraaryldipyrromonomethines by oxidation of the corresponding methanes.

The formation of the methines by oxidation may be represented, in equation form, as follows

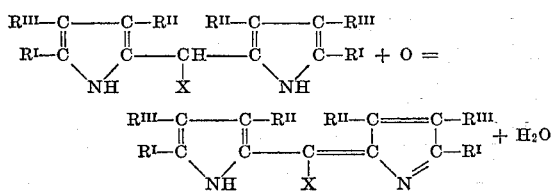

where $R^I$, $R^{II}$, $R^{III}$ and X have the significance given above.

As said, the oxidation may be effected with air. This is carried out conveniently by passing a stream of air through a solution and/or suspension of the methane in a suitable liquid, for example in ethanol. Other oxidising agents may also be used, for example, hydrogen peroxide, ferric chloride, lead peroxide and potassium dichromate.

The new methines are colouring matters and may be used as pigments or for other colouring purposes. In the form of their water-soluble derivatives, for example, salts, or sulphonic acids or salts of these, the new compounds may be used for dyeing.

Water-soluble derivatives may be obtained by forming the salts of those of the new compounds which are sufficiently basic, for example with sulphamic acid, by forming quaternary ammonium salts (when quaternary salt-forming groups are present) or by sulphonation of the new compounds to give compounds which are in themselves, or in the form of their salts, soluble in water. Alternatively, water-soluble derivatives may be obtained by using as one or both of the ingredients a compound containing already one or more water-solubilising groups, for example, sulphonic acid groups.

The invention is illustrated but not limited by the following example in which the parts are expressed by weight:

*Example*

3.285 parts of 2:4-diphenylpyrrole and 1.125 parts of 4-dimethylamino-benzaldehyde are dissolved in 50 parts of ethanol by stirring and heating under reflux. To this solution are added 0.56 parts of 36% aqueous hydrochloric acid, when the solution immediately becomes blue in colour. After a short time, whilst still refluxing, the colour fades and a white crystalline solid separates. After ¾ hour, the solid is collected by filtration, washed with a little cold ethanol and dried. It is the hydrochloride of the leuco compound, and the yield is 4.08 parts. The colourless hydrochloride is, when dry, fairly stable in air.

3.1 parts of the hydrochloride of the leuco compound are suspended in 50 parts of ethanol and 0.59 part of a 33% aqueous solution of caustic soda added. The mixture is warmed, whereupon the solid dissolves. The solution is diluted with water and the pale pink solid which separates is collected by filtration, washed with water and dried. It is the leuco-compound or methane and the yield is 2.78 parts.

The leuco compound is oxidised to the corresponding methine by dissolving 2.78 parts in 40 parts of ethanol, adding 1.59 parts of anhydrous ferric chloride, and boiling for 15 minutes. The solution develops an intense blue colour. An excess of water is added, whereupon the methine separates in the form of its hydrochloride. The hydrochloride is collected by filtration, washed with water and dissolved in 30 parts of ethanol. The solution is made alkaline to Brilliant Yellow and diluted with water, and the methine, which separates in the form of a plum coloured solid, is collected by filtration, washed with water and dried. The yield is 2.18 parts.

We claim:
1. Meso - substituted tetraaryldipyrromonomethanes of the formula:

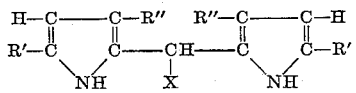

where R' and R'' are aryl radicals and X is a monovalent cyclic aromatic radical which contains at least one benzene nucleus and is linked to the acyclic bridging

group through a cyclic carbon atom.

2. Tetraaryldipyrromonomethanes of the formula:

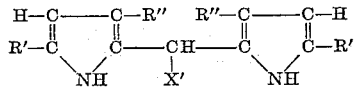

where X' is a phenyl radical and R' and R'' are phenyl radicals.

3. A process for the manufacture of meso-substituted tetraaryldipyrromonomethanes having unsubstituted hydrogen atoms in the 3 position of the pyrrole rings which comprises causing to interact two mols of at least one 2,4-diarylpyrrole having an unsubstituted hydrogen atom in the 3 position and one mol of an aromatic aldehyde.

4. A process for the manufacture of meso-substituted 2,4-tetraaryldipyrromethines which comprises oxidizing a 2,4-tetraaryldipyrromethane having the formula set forth in claim 1 and recovering a compound of the formula:

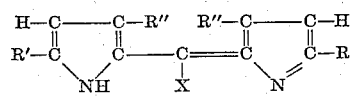

where R' and R'' are aryl radicals and X is a monovalent organic radical of a type corresponding to that radical in an aldehyde of the formula XCHO, wherein X constitutes the residue of said aldehyde.

5. A process for the manufacture of meso-substituted tetra-aryldipyrrolemonomethines which comprises causing to interact two molecular proportions of at least one 2:4-diarylpyrroles having an unsubstituted hydrogen atom in the 3-position and one molecular proportion of an aromatic aldehyde and oxidizing the resulting meso-substituted tetra-aryldipyrrolemonomethanes and recovering a compound of the formula:

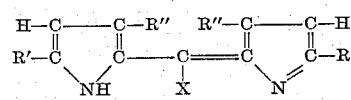

where R' and R'' are aryl radicals and X is a monovalent organic radical of a type corresponding to that radical in an aldehyde of the formula XCHO, wherein X constitutes the residue of said aldehyde.

ERIC PAUL GOODINGS.
MAURICE ARTHUR THOROLD ROGERS.

REFERENCES CITED

The following references are of record in the file of this patent:

UNITED STATES PATENTS

| Number | Name | Date |
|---|---|---|
| 1,934,658 | Brooker | Nov. 7, 1933 |
| 1,148,637 | Thiele | Aug. 3, 1915 |

OTHER REFERENCES

Richter, Textbook of Organic Chemistry (John Wiley & Sons), page 653 (1938).

Fischer et al., Chemie des Pyrrols, vol. I, Leipsig (1934), pp. 351–352.